(12) United States Patent
Iskrenovic

(10) Patent No.: US 7,946,802 B1
(45) Date of Patent: May 24, 2011

(54) WIND TURBINE UTILIZING WIND DIRECTING SLATS

(75) Inventor: Zoran Iskrenovic, Nis (RS)

(73) Assignee: Seven International Group, Inc., Los Angeles, CA (US)

( * ) Notice: Subject to any disclaimer, the term of this patent is extended or adjusted under 35 U.S.C. 154(b) by 0 days.

(21) Appl. No.: 12/910,580

(22) Filed: Oct. 22, 2010

Related U.S. Application Data

(60) Provisional application No. 61/323,500, filed on Apr. 13, 2010.

(51) Int. Cl.
*F03D 3/04* (2006.01)
(52) U.S. Cl. .......................... 415/4.2; 415/909; 416/119
(58) Field of Classification Search .................. 415/909, 415/2.1, 3.1, 4.1, 4.3, 4.5, 905, 906, 907; 416/DIG. 9, 142, 143, 119, 17, 55, 132 B
See application file for complete search history.

(56) References Cited

U.S. PATENT DOCUMENTS

| | | | |
|---|---|---|---|
| 772,786 A | 10/1904 | Clifford | |
| 4,015,911 A * | 4/1977 | Darvishian | .................... 416/119 |
| 4,070,131 A | 1/1978 | Yen | |
| 4,725,194 A | 2/1988 | Bartsch | |
| 4,935,639 A | 6/1990 | Yeh | |
| 6,962,478 B2 | 11/2005 | Tsipov | |
| 7,591,635 B2 | 9/2009 | Ryu et al. | |
| 2009/0066088 A1 | 3/2009 | Liang | |
| 2009/0315332 A1 | 12/2009 | Sheikhrezai | |

FOREIGN PATENT DOCUMENTS

JP 56113068 A * 9/1981

* cited by examiner

*Primary Examiner* — Richard Edgar
(74) *Attorney, Agent, or Firm* — Fish & Associates, PC

(57) ABSTRACT

Various embodiments of a wind turbine are disclosed having a plurality of pivotable slats disposed about a rotor coupled to one or more blades. Each of the plurality of slats can be pivoted such that the open slats on a windward side redirect the wind to cause rotation of the rotor and the closed slats on a leeward side retain at least a substantial portion of the wind within the interior.

11 Claims, 7 Drawing Sheets

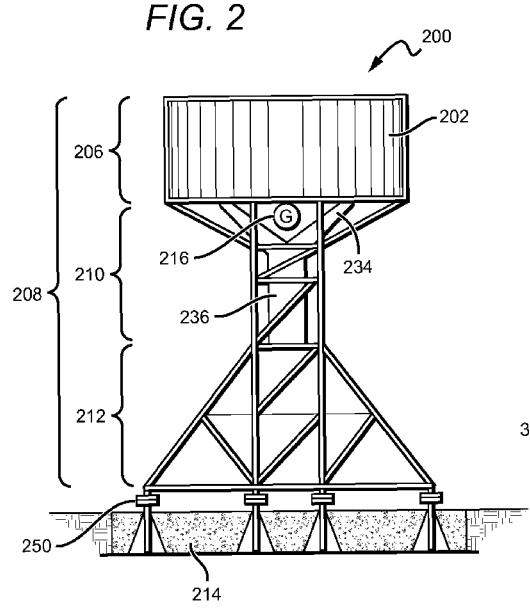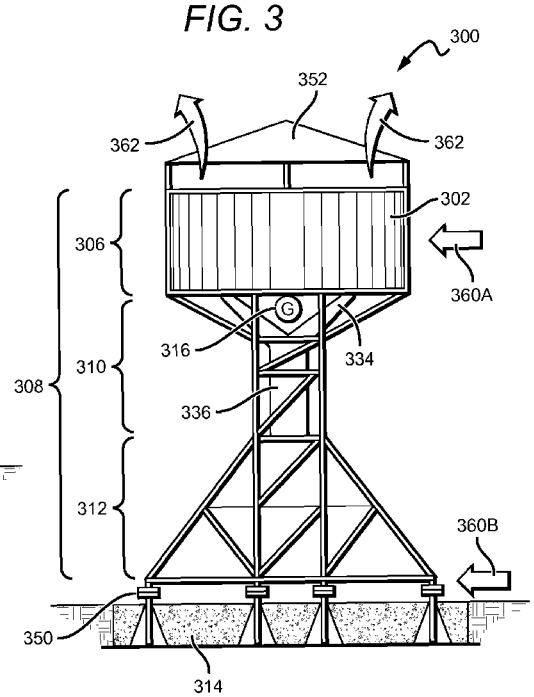

WIND TURBINE UTILIZING WIND DIRECTING SLATS

RELATED APPLICATIONS

This application claims priority to U.S. provisional patent application Ser. No. 61/323,500, filed Apr. 13, 2010.

FIELD OF THE INVENTION

The field of the invention is wind turbines.

BACKGROUND

Windmills have been used for hundreds, if not thousands of years, for a variety of uses. Modern wind turbines typically utilize one or more blades coupled to a rotor, which convert the kinetic energy of wind into mechanical energy as the rotor is turned by the wind. The blades typically range in length from about 65 to 130 feet (20 to 40 meters) or more. Although these wind turbines can create energy without the need for fossil fuels, they suffer from a number of disadvantages, including: (a) high initial costs including transportation of the blades and other components; (b) high costs and time required for maintenance due to their often large dimensions; (c) inability to operate in high wind conditions (e.g., above 25 mph); (d) inability to quickly adapt to changing wind directions; (e) need for a motor to rotate and thereby redirect the turbine as the wind direction changes; (f) need for large amounts of unobstructed space; and (g) locations often being far away from where the energy will be used.

U.S. Pat. No. 4,365,929 to Retz, U.S. Pat. No. 4,935,639 to Yeh, and U.S. Pat. No. 7,329,965 to Roberts et al. discuss vertical-axis wind turbines that have multiple wind channels disposed about a rotor and blades in order to direct the wind against the blades. Retz, Roberts, and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. However, these turbines do not allow the wind channels to pivot as a function of the wind direction.

U.S. Pat. No. 4,070,131 to Yen discusses a wind turbine having a plurality of vanes surrounding a rotor, which allow wind to enter the turbine between the vanes. Yen contemplates that the vanes can be pivotable with respect to the turbine structure. However, the vanes are open and closed electronically, which adds complexity to the turbine and reduces the power produced.

It is known to have a plurality of baffle panels that are disposed about a rotor, as described in U.S. Pat. No. 4,725,194 to Bartsch. However, the baffle panels are configured to prevent wind from accessing the windmill once the wind reaches a predetermined velocity, and are not used to direct wind against the windmill's rotor.

U.S. Pat. No. 6,962,478 to Tsipov discusses a vertical axis windmill having a turbine and a plurality of movable gate elements that direct airflow within the windmill. However, the gate elements can be opened as a function of the wind flow within the windmill, and thus allow wind within the windmill to escape through the gate elements, rather than retain the wind within the windmill. The Tsipov windmill is disadvantageous in that it is not efficient in capturing the energy from the wind.

U.S. Patent Appl. No. 2009/0066088 to Liang and U.S. Patent Appl. No. 2009/0315332 to Sheikhrezai discuss improved vertical axis wind turbines. However, these turbines are disadvantageous because they fail to include a plurality of vanes disposed about the blades to thereby direct wind against the blades.

Thus, there is still a need for wind turbine that can (a) immediately adapt to changes in wind direction without the use of motors, and (b) operate in low and high wind conditions.

SUMMARY OF THE INVENTION

The inventive subject matter provides apparatus, systems and methods in which a wind turbine includes a rotor coupled to a support structure and a plurality of pivotable slats disposed about the rotor to define an interior. As used herein, the term "wind turbine" means a rotating machine which converts the kinetic energy of wind into mechanical energy. As used herein, the term "coupled to" means that a first object is connected directly or indirectly to a second object. An indirect connection can be by way of one or more intermediate objects.

Two or more blades can be coupled to the rotor, and each blade preferably has at least one closable opening. Currently preferred wind turbines have between three and six blades, although rotors having two blades or seven or more blades are also contemplated. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Initially, the slats can be in a closed position. As wind contacts an outside surface of one or more of the slats on the windward side, those one or more slats can begin to open depending on the wind speed. Once opened, wind can pass through spaces between the one or more opened slats, and the open slats can direct the wind against the blades. As used herein, the term "outside surface" means the surface of the slat facing away from the rotor of the wind turbine, and the term "inside surface" means the surface of the slat facing toward the rotor. Thus, the outside surfaces of the slat can define an exterior portion of the wind turbine, and the inside surfaces of the slats can define an interior portion of the wind turbine. As used herein, the term "windward side" means the portion of the wind turbine upwind from the rotor, and the term "leeward side" means the portion of the wind turbine downwind from the rotor and generally is the non-windward portion. For example, if the wind direction was easterly, the windward side would be the eastern portion of the wind turbine, and the leeward side would be the western portion of the wind turbine. As the wind direction changes, the windward side and leeward side of the wind turbine will also change.

As the wind contacts the blades, the blades and the rotor begin to rotate about the rotor's axis. The wind can pass about an interior of the wind turbine, and contact the interior surfaces of the slats, which can thereby enact a force upon the slats to keep those slats closed such that at least a substantial portion of the wind remains within the wind turbine's interior. The wind can continue about the turbine's interior until the wind reaches an open slat. At that point, the slat either remains open if the pressure on the outside surface of the slat is greater than the pressure on the inside surface, or closes if the pressure on the outside surface of the slat is less than the pressure on the inside surface. If the slat remains open, the open slat can direct the wind against the blade(s).

The slats preferably open to a maximum of between about 20-45 degrees with respect to a point on the support structure to which each slat is coupled, although the specific maximum may vary depending on wind conditions. For example, if the structure is cylindrical, the angle would be with respect to a tangent touching the point at which the slat is coupled to the structure. For a rectangular structure, the angle would be with respect to the side of the structure to which the slat is coupled. Ideally, the slats are configured such that the wind passing through the opening between slats is directed at the blades, and more preferably, at the first and second sections of the blades.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 2 is a front perspective view of another embodiment of a wind turbine.

FIG. 3 is a front perspective view of yet another embodiment of a wind turbine having a top cover.

DETAILED DESCRIPTION

The various configurations of the wind turbines contemplated herein provide numerous advantageous over prior art configurations. For example, the contemplated wind turbines allow the rotor to operate in low wind conditions (e.g., less than 5 mph), and can reach peak performance at much lower wind speeds than other configurations. Unlike typical wind turbine installations of the prior art, the contemplated wind turbines can also safely operate at high wind speeds (e.g., greater than 25 mph) and can therefore take advantage of much stronger winds. In addition, the wind turbines contemplated herein are able to immediately adapt to changing wind directions. Furthermore, the inventive wind turbine's unique system of inwardly-opening slats allows the turbine to capture a larger portion of the wind's energy than those turbines and windmills of the prior art with outwardly-opening slats, or no slats at all.

Figure 1:
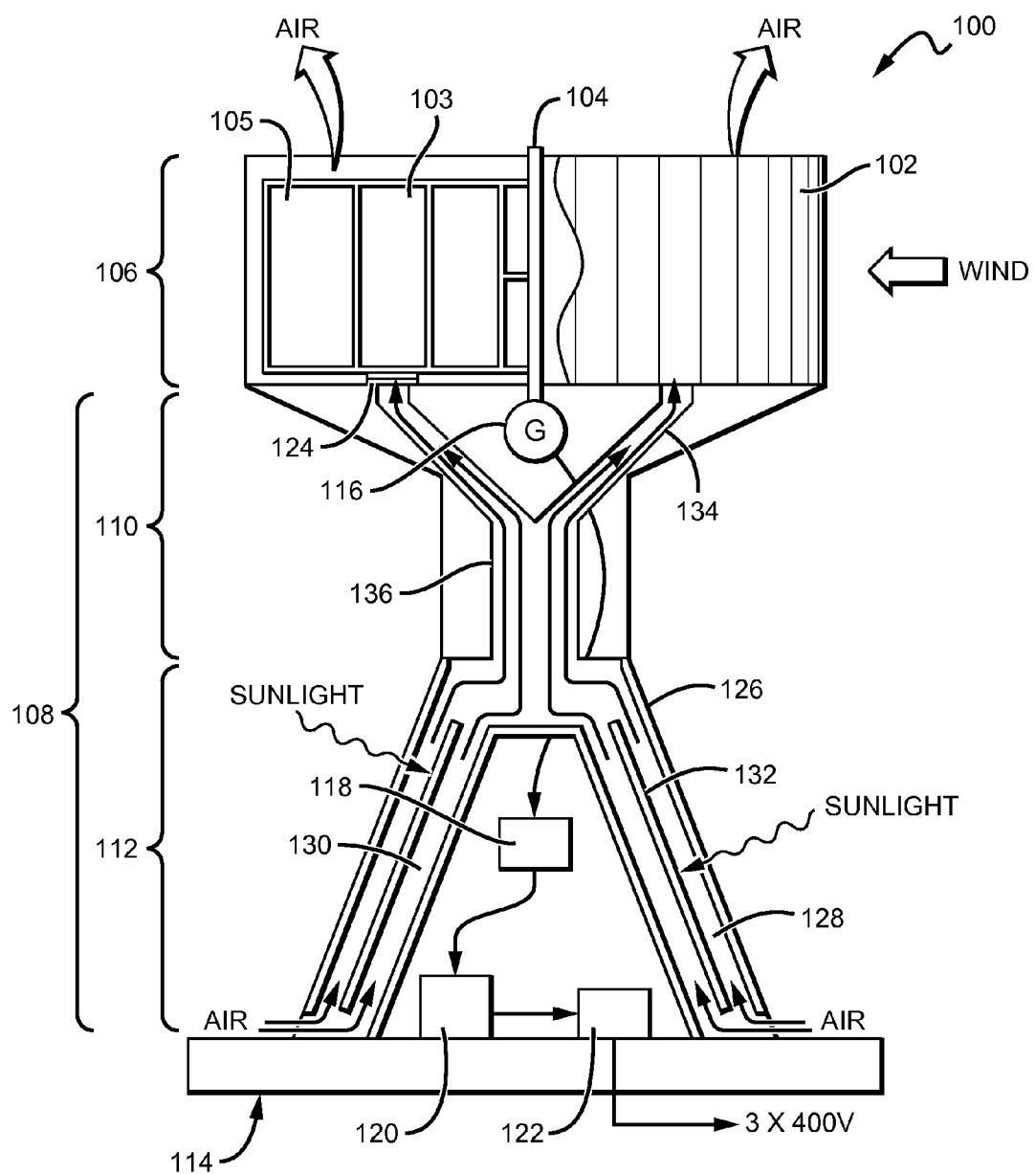
FIG. 1 is a front perspective view of one embodiment of a wind turbine.

In FIG. 1, one embodiment of a wind turbine 100 is shown having a support structure 106 and plurality of slats 102 disposed about a rotor 104. The support structure 106 could alternatively be ovular, rectangular, square, hexagonal, or any other commercially suitable shape(s). In some contemplated embodiments, the support structure 106 could be constructed to resemble a playhouse or other shape or form to enable the wind turbine 100 to more effectively blend into the surrounding area. For example, the wind turbine can be disguised as a playhouse (shown in FIG. 4) or other form, which is especially advantageous for wind turbines deployed in residential areas because the turbines might otherwise be an eye sore.

The support structure 106 can be coupled directly or indirectly to a base 108, which can have upper 110 and lower portions 112. The lower portion 112 of the base 108 is preferably mounted to a foundation 114, which could be the ground, lake, ocean, or elsewhere, or a separate platform composed of wood, steel, cement, or other commercially suitable material(s) or combination(s) thereof. For wind turbines 100 configured to be deployed on the ocean, preferred platforms are sufficiently buoyant to allow the wind turbine 100 to float on the ocean or other body of water. The foundation 114 advantageously helps to keep the wind turbine 100 upright, especially in higher wind conditions. Alternatively, the wind turbine 100 could be mounted directly to the ground, a home or other existing structure, a tree, and so forth, with or without base 108, such that the wind turbine 100 can remain in an upright position even in stronger wind gusts.

The slats 102 can be pivotally coupled to the support structure 106 such that the slats 102 can be opened or closed as a direct function of the wind, in contrast to prior art wind turbines that require electricity or manual movement of a lever or other structure to rotate the slats or other structures. In preferred embodiments, each slat 102 on the windward side of the wind turbine 100 can generally be opened when the wind contacts an outside surface of the slat 102, and can generally be closed when wind contacts the inside surface of the slat 102. Whether the slat 102 opens or closes and the degree of movement can depend upon many factors including, for example, the wind speed, whether the slat is on the windward side or leeward side, any counter-resistance, the weight of the slats, and so forth. In situations where wind contacts both the inside and outside surfaces of the slat 102, the slat 102 can be opened if the pressure on the outside surface is greater than the pressure on the inside surface, and the slat 102 can be closed if the pressure on the outside surface is less than the pressure on the inside surface. In this manner, as the wind direction changes, one or more of the open slats can close, and one or more of the closed slats can open, such that the wind turbine is quickly adapted to changes in wind direction.

In preferred embodiments, each of the slats 102 can be individually pivoted about its own axis. This allows for optimal slat orientation relative to wind direction and speed. Although it is contemplated that the slats 102 could translate, i.e., revolve about a common center in addition to rotating about each slat's individual axis of rotation, preferred embodiments pivot but do not revolve.

As the wind contacts one or more slats 102 on the windward side, those slats 102 are opened, which thereby creates spaces through which the wind can pass. As the wind passes through the spaces between the opened slats 102, the opened slats 102 can advantageously direct the wind against one or more of the blades 105, which causes the rotor 104 to rotate. Advantageously, the closed slats 102 on the leeward side can retain at least a substantial portion of the wind that entered the wind turbine 100 within the interior of the wind turbine 100.

At least two, and preferably between three and six blades 105, can be coupled to the rotor 104. Each of the blades 105 can have at least one opening, and can have at least one blade slat 103 that can pivot about an axis to thereby open and close an opening in the blade 105.

The rotor 104 can be coupled directly or indirectly to a generator 116, which is configured to convert the kinetic energy of the wind into mechanical energy. For example, rotation of the rotor 104 can rotate one or more gears (not shown) coupled to the generator 116 to generate electricity. One skilled in the art will realize that the specific generator used will depend on many factors, including the number of rotor blades and the average wind velocity.

It is contemplated that the generator 116 could be coupled to an inverter 118, which can itself be coupled to a corrector 120 and an accumulator 122 to equalize the voltage and convert it into a desired voltage for consumers (e.g., 110 volts in the U.S.). A reduction gear (not shown) can optionally be added depending on the rotation speed of the rotor and the generator used.

Figure 7A:
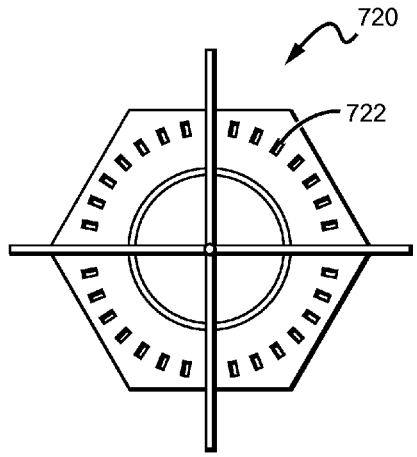
FIGS. 7A and 8A are top perspective views of two different embodiments of a plate having a plurality of apertures.
Figure 8A:
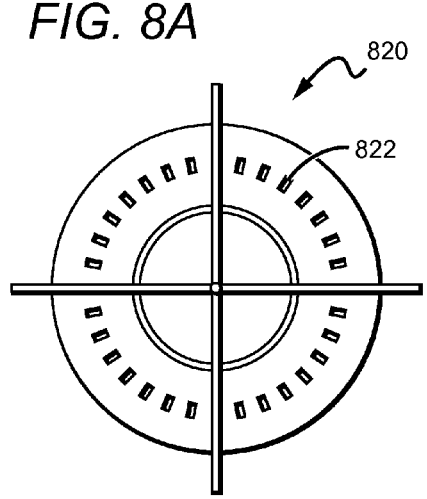

A plate or other device (not shown) can be disposed upstream of the blades 105, which in this embodiment, is beneath the blades 105. Preferably, the plate is coupled to the rotor 104 such that the plate can rotate with the rotor 104. The plate can have at least one aperture 124 through which air can flow and preferred apertures are angled such that the air is directed toward one or more blades 105. Two embodiments of a plate are shown in FIGS. 7A and 8A. In addition, because the plate can be coupled to the rotor 104, the air passing through apertures 124 can cause the plate to rotate and thereby generate electricity through rotation of the rotor 104.

The air passing through the apertures 124 can be heated in the lower portion 112 of the base 108, although it is contemplated that the air could alternatively or additionally be heated in the upper portion 110. The lower portion 112 of the wind turbine 100 can be at least partially enclosed by a cover 126 preferably composed of a glass/metal combination, although contemplated covers can alternatively be composed of one or more layers of glass, metals or metal composites, or any commercially suitable material(s) or combination(s) thereof, such that air can be heated by the sun or other heat source as it flows through the lower portion 112.

As shown in FIG. 1, air can enter the lower portion 112, and rise up through channels 128 and 130 as it is heated. One or more heat collectors 132 can be disposed within or adjacent to channels 128 and 130 to provide additional sources of heat. The heat collectors 132 are preferably composed of copper or other metals, metal composites, or any other commercially suitable material(s) or combination(s) thereof that can conduct heat. In this manner, the air can be heated as it passes through channels 128 and 130.

The heated air can then pass through channels 134 of chimney 136 and finally past apertures 124, although any commercially suitable distribution device(s) could be used. The wind turbine 100 can thus harvest energy from both the wind, and the sun's heat, and transform that energy into electrical energy. Although chimney 136 is shown as having a Y-shape, any sized and shaped conduit could be used such that the heated air can be fed to the plate. For example, a chimney with a single channel, or a chimney having an outwardly tapered end could be used. Alternatively, the chimney 136 could be completely eliminated with the lower portion 112 being coupled to the plate.

FIG. 2 illustrates another embodiment of a wind turbine 200, in which the lower section 212 is coupled to a foundation 214 by supports 250. The foundation 214 could be composed of any suitable material(s) including, for example, dirt, cement, and any combination(s) thereof. The specific sizes and dimensions of the components of the wind turbine 100 in the figures are shown for illustrative purposes only. Actual sizes and dimensions of each component can vary depending on the application. With respect to the remaining numerals in FIG. 2, the same considerations for like components with like numerals of FIG. 1 apply.

FIG. 3 illustrates yet another embodiment of a wind turbine 300 having a top cover 352 disposed above the turbine 300 that can be used to protect the wind turbine 300 against rain, snow, or other elements of nature. In such embodiments, it is contemplated that the top cover 352 can be coupled to the structure 306 such that a space will remain between the top cover 352 and the structure 306 to allow air to exit from the wind turbine 300.

Air/wind 360A and 360B enter the wind turbine 300 through opening(s) between the slats 302, and from an opening in the body 308 of the wind turbine 300, respectively. Air 360B is heated in lower section 312 and rises through chimney 336 and is preferably directed at the blades to rotate the blades and thereby cause rotation of the rotor. Air 360B exits the turbine 300 as shown by arrow 362. The slats direct air/wind 360A at the blades to cause the blades to rotate. The air then circulates about the interior of the wind turbine 300, and preferably circulates at least two times, before exiting an upper portion of the wind turbine 300 as air 362. By configuring the turbine 300 such that the air circulates more than once prior to exiting the turbine 300, additional energy can be extracted from the air 360A. With respect to the remaining numerals in FIG. 3, the same considerations for like components with like numerals of FIG. 1 apply.

Figure 4:
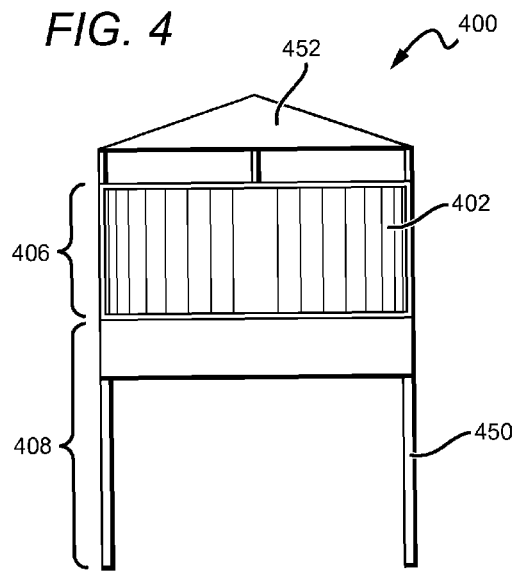
FIG. 4 is a side perspective view of an alternate embodiment of a wind turbine.

In FIG. 4, a wind turbine 400 is shown that has a structure 406 sized and dimensioned to resemble a children's play house. The lower portion 408 of the wind turbine 400 can include stilts 450 or other supports such that the turbine is raised off from the ground to allow the turbine to access greater wind velocities. However, it is contemplated that the wind turbine 400 could be placed in a tree or existing structure, and in such cases would not require the stilts 450. With respect to the remaining numerals in FIG. 4, the same considerations for like components with like numerals of FIG. 3 apply.

Figure 5A:
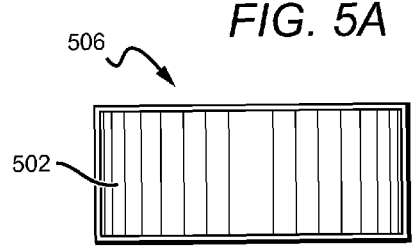
FIG. 5A is a side perspective view of a plurality of slats coupled to a structure.
Figure 5B:
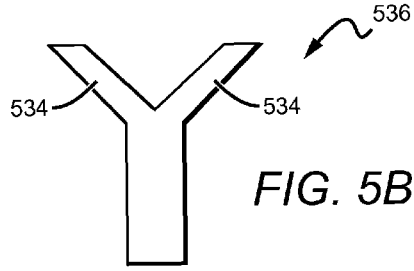
FIG. 5B is a side perspective view of an air distribution mechanism.

FIG. 5A illustrates an embodiment of a wind turbine structure 506 having a plurality of slats 502 disposed about an exterior of the structure 506 to thereby define an interior. FIG. 5B illustrates an embodiment of a chimney 536 having two channels 534 to form a Y-shape. However, in alternative embodiments, the chimney could have a single channel or three or more channels. In FIG. 5C, a covered section 570 is shown that has both metal covers 574 and 576 and a glass cover 572. The metal covers 574 and 576 can each be composed of steel, copper, aluminum or other metals, metal composites, or combination(s) thereof. The covered section 570 can advantageously be used to heat air within the covered section 570 to thereby use the heated, rising air to cause rotation of a rotor (not shown). Preferred sections 570 are completely covered, although it is contemplated that the section 570 could have non-covered portions.

Figure 5D:
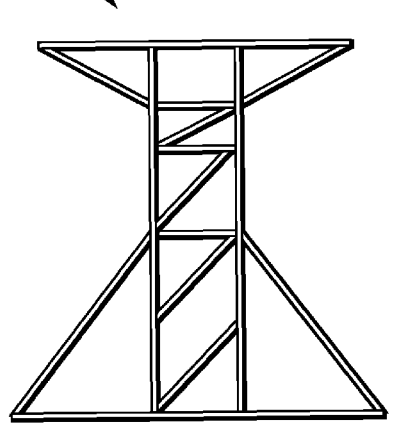
FIG. 5D is a side perspective view of a structural frame for a wind turbine.
Figure 5C:
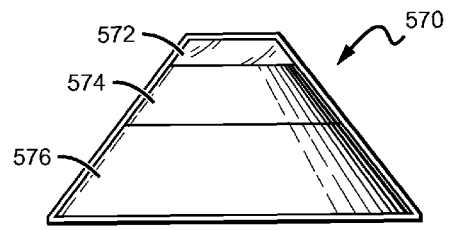
FIG. 5C is a side perspective view of an at least partially enclosed cover.
Figure 5E:
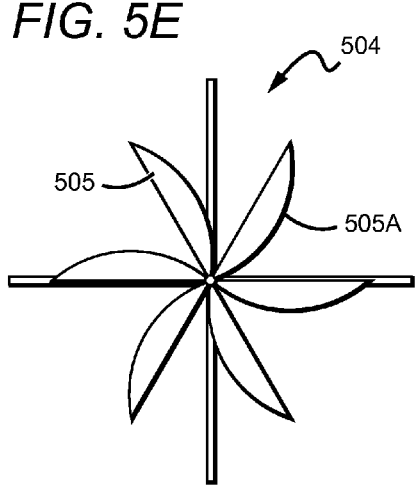
FIG. 5E is a top perspective view of a plurality of blades coupled to a rotor.

FIG. 5D illustrates a base structure 508 for a wind turbine. The base structure 508 can comprise one or more metals or metal composites, woods, brick, or any other commercially suitable material(s) or combination(s) thereof. In FIG. 5E, a rotor 504 is shown having six blades 505, although the specific number of blades could vary depending on average wind conditions, the size and dimension of the structure, the size and dimension of the blades, and so forth. The blades 505 can be of any commercially suitable size and dimension, and each of the blades 505 preferably has at least one concavity 505A.

Figure 5F:
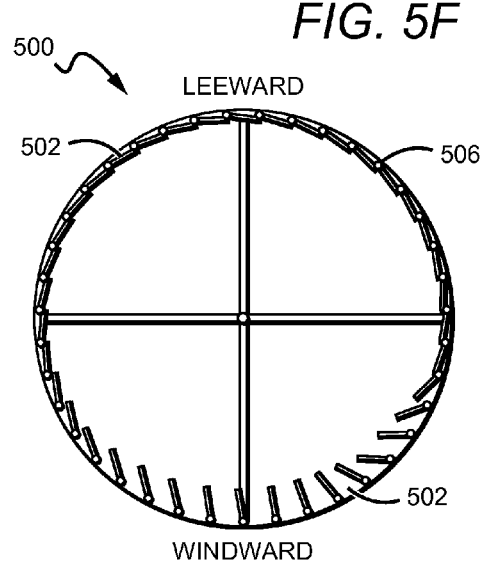
FIG. 5F is a top perspective view of a plurality of slats coupled to a structure.

FIG. 5F illustrates an embodiment of a wind turbine 500 having a plurality of slats 502 pivotally coupled to, and disposed about, an exterior of structure 506. This is advantageous as it allows the slats to open or close as a function of the wind. This in turn allows the wind turbine to immediately adapt to a change in wind direction without the need for any electronics, hydraulics, motors, etc. Wind can contact slats 502 on the windward side and cause some of the slats 502 to open, while the slats on the leeward side close or stay closed. As the wind direction changes, the windward side and leeward side of the wind turbine 500 can change, and some of the open slats on the now leeward side can close, while some of the closed slats on the now windward side can open. The degree at which each slat 502 is opened can depend upon the wind velocity, although it is contemplated that the slats 502 could be limited to opening only 30 degrees, more preferably, 35 degrees or 40 degrees, and most preferably, 45 degrees. Wind can then pass through the slats 502 and circulate about an interior portion of the wind turbine 500.

Although specific dimensions are shown in FIGS. 5A-5F, the specific sizes and dimensions of the components of the wind turbine are shown for illustrative purposes only. The actual sizes and dimensions of the components of the wind turbine can vary depending on the size of the rotors used, and the particular application.

Figure 6A:
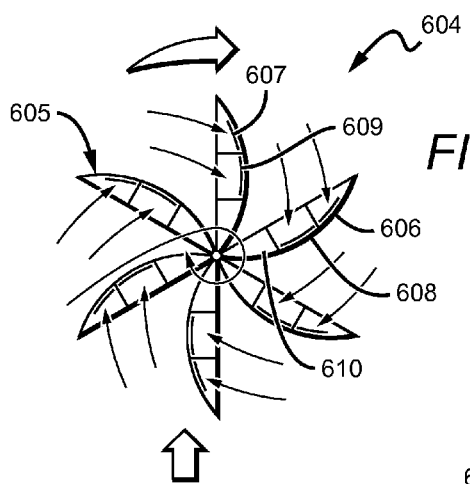
FIG. 6A is a top perspective view of one embodiment of a rotor with attached blades.
Figure 6B:
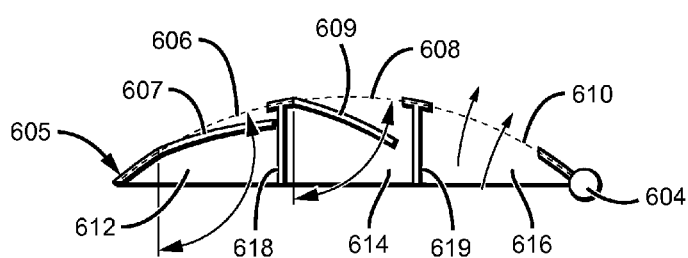
FIGS. 6B-6C are top and front perspective views, respectively, of one embodiment of a blade.
Figure 6C:
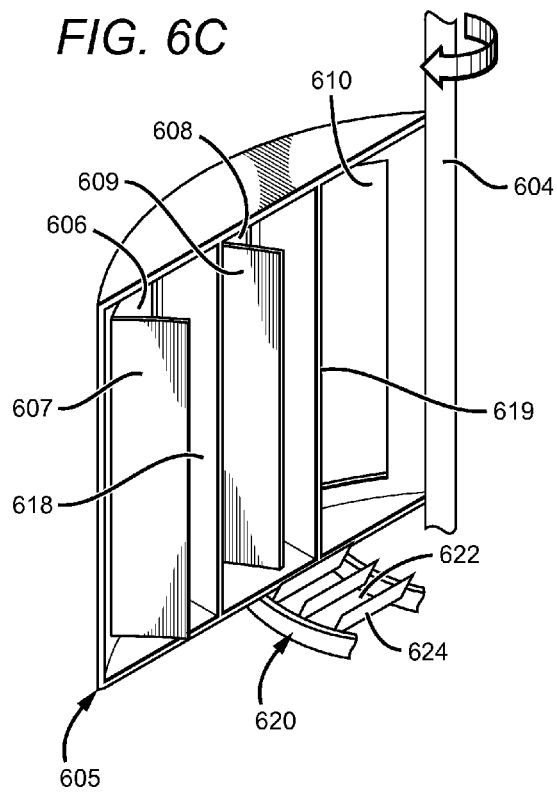

FIGS. 6A-6C illustrates embodiments of a rotor 604, which is coupled to blades 605. As shown in FIG. 6A, the rotor 604 can have six blades 605, although it is contemplated that the rotor could have as few as two blades, or have three, four, five, or more than six blades. shown. Preferred rotors 604 include between three and six blades 605, although the number and size and dimension of each blade 605 will depend on the application and average wind velocity of the surrounding environment. Each of the blades 605 can have three openings 606, 608, and 610, although the number of openings can be varied. It is alternatively contemplated that each blade 605 could lack any openings, but preferred blades have at least one opening that can optionally have one or more blade slats.

Openings 606 and 608 can have blade slats 607 and 609, respectively, which open and close as a result of the pressure differential between the back and front section of the blades 605, and the blade slats 607 and 609. The blade slats 607 and 609 can be configured to regulate air flow through respective first and second openings 606 and 608. Preferred blade slats open toward a face of the blade. While opening 610 lacks a blade slat, it is contemplated that opening 610 could also have a blade slat or a screen. In preferred embodiments, each blade 605 can be divided into three sections 612, 614, and 616. In this manner, the first section 612 can include the first opening 606, the second section 614 can include the second opening 608, and the third section 616 can include the third opening 610, although other arrangements are contemplated such as two openings in one section. The sections 612, 614, and 616 can be separated by walls 618 and 619, although it is also contemplated that one or more of the walls 618 and 619 could be removed.

As shown in FIG. 6C, the blade can be disposed over a plate 620 having a plurality of apertures 622 and a plurality of fins 624 that direct air flowing through the apertures 622 at the blades 605 to thereby cause rotation of the rotor 604.

FIG. 7A illustrates one embodiment of a plate 720 having a hexagonal shape, and including a plurality of apertures 722 disposed in a circular manner, although other arrangements are contemplated. FIG. 8A illustrates another embodiment of a plate 820 having a circular shape, and including a plurality of apertures 822 disposed in a circular manner, although other arrangements are contemplated. It is contemplated that the plate could have any commercially suitable size and dimension, including, for example, square-shape, ovular-shape, pentagon-shape, octagon-shape, and so forth. In addition, while specific dimensions are given, these dimensions are merely exemplary, and could vary depending on the overall size and dimension of the wind turbine.

In this manner, air flowing through the plates 720 and 820 can pass through at least some of the apertures 722 and 822, respectively. The apertures 722 and 822 can be angled such that air flowing through the apertures 722 and 822 is directed at one or more blades 705 and 805, respectively. In preferred embodiments, the plates 720 and 820 can be coupled to the rotor 704 and 804, respectively, and thereby rotate along with the blades 705 and 805. In addition, the heated air passing through the apertures 722 and 822 can assist in rotating the plates 720 and 820 and rotor blades 705 and 805, respectively, and thereby generate electricity.

Figure 7B:
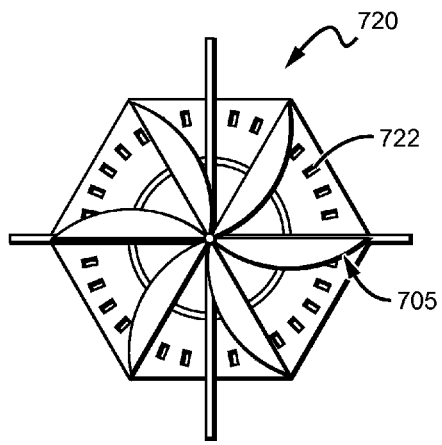
FIGS. 7B and 8B are top perspective views of a rotor having a plurality of blades and disposed above the plate shown in FIGS. 7A and 8A, respectively.
Figure 8B:
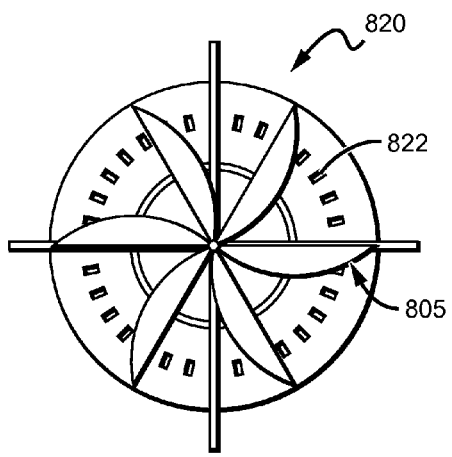

FIG. 7B illustrates the plate 720 of FIG. 7A having the plurality of apertures 722, in which a plurality of blades 705 coupled to a rotor 704 are disposed above the plate 720. FIG. 8B illustrates the plate 820 of FIG. 8A having the plurality of apertures 822, in which a plurality of blades 805 coupled to a rotor 804 are disposed above the plate 820.

Figure 7C:
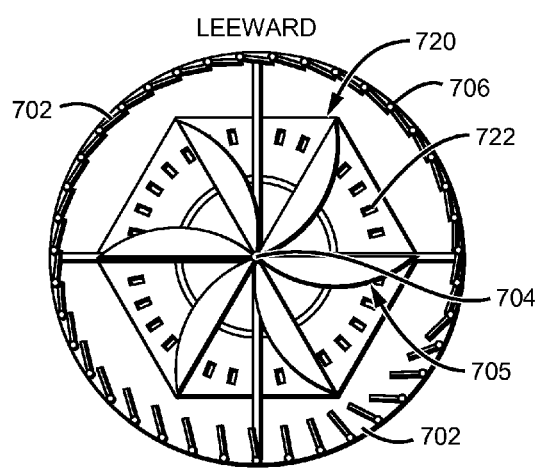
FIGS. 7C and 8C are top perspective views of another embodiment of a wind turbine.

In FIG. 7C, the plate 720, rotor 704 and blades 705 shown in FIG. 7B are disposed within a structure 706. The structure 706 can have a plurality of slats 702 disposed about an exterior of the structure 706 that define the structure's interior. As shown in FIG. 7C, the wind can open at least some of the slats 702 on the windward side to create openings through which the wind can enter the wind turbine 700. The slats 702 also can direct the wind toward the blades 705, and preferably toward the first and second sections of the blades 705. This causes the rotor 704 to turn, and the wind to circulate about an interior of the wind turbine 700. In addition, heated air can flow through the plurality of apertures 722 in the plate 720 and be directed at the blades 705. This additional air flow can be used to rotate the rotor 704 and thereby generate additional electrical power.

The wind and/or air can then circulate about an interior of the wind turbine 700. As the wind circulates, at least a portion of the wind will contact with the open slats 702A, which will redirect the wind against the blades 705, and preferably, second and third sections of the blades 705. Contrary to wind turbines of the prior art that allow the wind to exit an opposite side of the turbine, the circulation of the wind within the turbine advantageously allows the wind turbine 700 to realize a greater portion of the kinetic energy of the wind. The wind can then be re-circulated about the interior of the wind turbine 700 until the wind exits the wind turbine 700 through a top opening (not shown). In this manner, more of the wind's energy can be harvested prior to the wind exiting the wind turbine 700. It is contemplated that the wind could circulate about an interior of the wind turbine 700 for two or three revolutions, or more, prior to exiting the turbine 700.

Figure 8C:
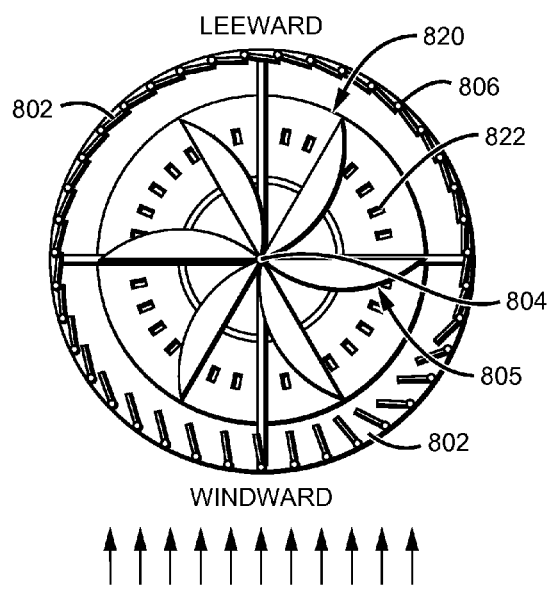

In FIG. 8C, the plate 820, rotor 804 and blades 805 shown in FIG. 8B are disposed within a structure 806. With respect to the remaining numerals in FIG. 8C, the same considerations for like components with like numerals of FIG. 8B apply.

Figure 9A:
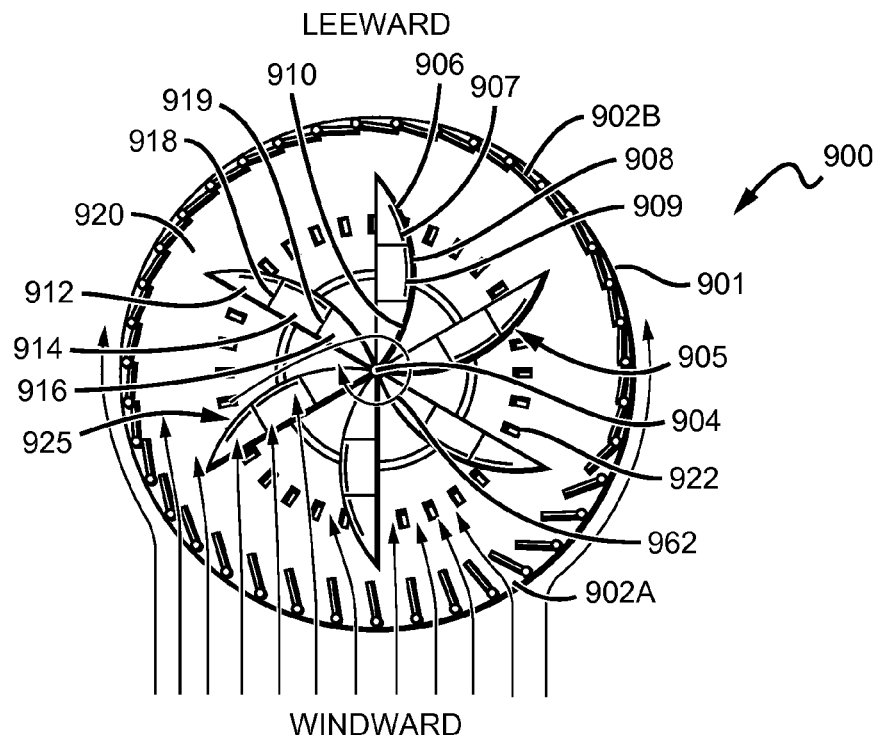
FIGS. 9A and 9B are top perspective views of yet another embodiment of a wind turbine illustrating wind flow.
Figure 9B:
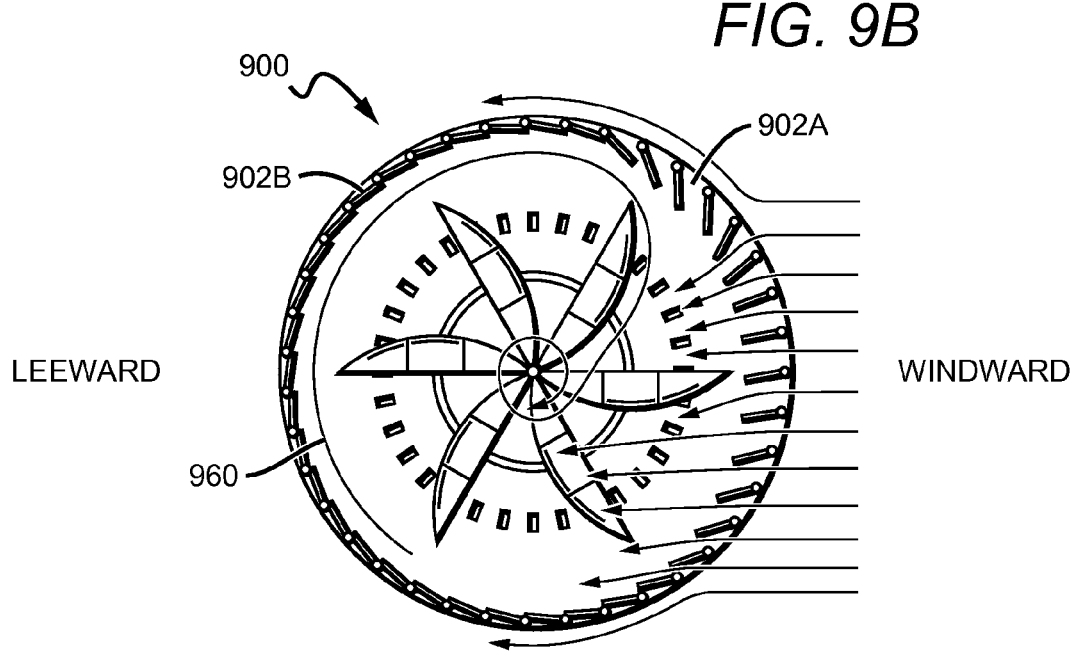

FIGS. 9A-9B illustrate a wind turbine 900 having an outer structure 901 that can surround the blades 905 and contains a plurality of slats 902 that are each pivotable about an axis depending on the direction of the wind. As shown in FIG. 9A, the wind approaches the wind turbine 900 from the south, and as the wind contacts the slats 902 on the windward side (e.g., southern-facing portion) of the wind turbine 900, the slats 902A are encouraged to open while the remaining slats 902B on the leeward side remain closed. Similarly, in FIG. 9B, the wind approaches the wind turbine 900 from the east, which encourages the eastern slats 902A of the wind turbine 900 to open, while the other slats 902B remain closed.

The slats 902A can initially direct the wind against first 912 and second sections 914 of the blades 905, which causes the blades 905 to rotate in the direction shown by line 962. The remainder of the wind within the wind turbine 900 can be forced to circulate about the interior of the wind turbine 900 as shown in FIG. 9B by line 960, until the wind reaches the opened slats 902A. Upon reaching the opened slats 902A, the wind can be directed to the second section 914 and third section 916 of the blades 905, where the wind continues to circulate about the rotor axle 904 to create a vortex flow that eventually exits a top of the wind turbine 900.

The sections 912, 914, and 916 can be separated by walls 918 and 919, although it is also contemplated that one or more of the walls 918 and 919 could be removed Each of the first section 912, second section 914, and third sections 916 of the blades 905 can each have an opening 906, 908 and 910, respectively. In preferred embodiments, at least the first 912 and second sections 914 can also include pivotable blade slats 907 and 909, which can be pivoted about an axis to open or close openings 906 and 908, respectively. The openings 906, 908 and 910 and blade slats 907 and 909 allow back pressure such as due to vortices on the back portion 925 of the blades 905 to be reduced or otherwise controlled such that if the back pressure acting on a blade 905 becomes greater than the forward pressure acting on that blade 905, one or more of the blade slats 907 and 909 will at least partially open to reduce the pressure differential. This advantageously prevents the situation in which the back pressure can inhibit rotation of the blades 905.

The wind turbine 900 can also include a plurality of apertures 922 disposed on a rotating plate 920 beneath the blades 905, and through which heated air from a lower portion of the wind turbine 900 can pass.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A wind turbine having a windward side and a leeward side depending upon a direction of an oncoming wind, comprising:
    a support structure;
    a rotor coupled to the support structure and having at least first and second blades, wherein each of the blades has at least one closable opening;
    a first slat disposed on the windward side and pivotally configured to be opened by the wind;
    a second slat disposed on the leeward side and pivotally configured to be closed by the wind; and
    a plate that directs a flow of air against the blades from below the slats.

2. The wind turbine of claim 1, wherein each of slats are pivotally coupled to the support structure, and oriented such that the slats are pivotable as a direct function of an airflow.

3. The wind turbine of claim 1, wherein the plate is disposed upstream of the first and second blades, and includes a plurality of apertures configured to direct the flow of air against the first and second blades.

4. The wind turbine of claim 1, wherein the plate is rotatably coupled to the rotor.

5. The wind turbine of claim 1, further comprising an at least partially enclosed housing fluidly coupled upstream of the plate, and configured to heat the flow of air.

6. The wind turbine of claim 5, wherein the at least partially enclosed housing is composed of at least one of (a) glass and (b) metal plates.

7. The wind turbine of claim 1, wherein each of the blades includes (a) a first section having a first opening, and (b) a second section having a second opening.

8. The wind turbine of claim 7, further comprising first and second blade slats pivotally coupled to the first and second sections, respectively, and configured to regulate air flow through receptive first and second openings.

9. The wind turbine of claim 7, wherein at least one of the first and second blades further comprises a third section having a third opening.

10. The wind turbine of claim 8, wherein each of the first and second blade slats is configured to open toward a face of the first and second blades, respectively.

11. The wind turbine of claim 1, wherein each of the blades has a concavity.

\* \* \* \* \*